2,784,207

PROCESS FOR THE PREPARATION OF O,O-DIMETHYL O-PHENYL THIOPHOSPHATES

John Thomas Geoghegan, Port Chester, N. Y., and James Beverley McPherson, Jr., Greenwich, Conn., assignors to American Cyanamid Company, New York, N. Y., a corporation of Maine No Drawing. Application January 29, 1954,
Serial No. 407,142

8 Claims. (Cl. 260—461)

This invention relates to an improved method for preparing O,O-dimethyl O-phenyl thiophosphates and particularly, is concerned with the reaction of a phenol and O,O-dimethyl chlorothiophosphate in the presence of a catalyst and more specifically, it relates to this reaction wherein the catalyst is cuprous chloride.

It has been known prior to this invention that O,O-dimethyl O-phenyl thiophosphates could be prepared by heating O,O-dimethyl chlorothiophosphate with a sodium phenate at about 130° C. in the presence of monochlorobenzene but the yields of the ester and the degree of purity are exceedingly poor when operating the process within commercially feasible periods of time. As a result efforts have been made to obtain quantitative yields of O,O-dimethyl O-phenyl thiophosphates by other methods. One such method was to increase the temperature above 130° C. Another method was to employ catalysts, such as tertiary amines or metallic copper. All these efforts have been commercially unsuccessful, since quantitative yields and a high grade product uncontaminated with an anisole and acidic side reaction products could not be so obtained.

It is a principal object of this invention to overcome these difficulties. In effecting this result it is desirable to prepare O,O-dimethyl O-phenyl thiophosphates in a high state of purity and in more nearly quantitative yields. It is an object of this invention also to obtain these results in commercially feasible periods of time. It is a further object of this invention to provide for the elimination of water that is formed during the course of the reaction. The presence of any water surprisingly reduces the yield of O,O-dimethyl O-phenyl thiophosphates but does not so affect the yield of the corresponding diethyl homologue, O,O-diethyl O-phenyl thiophosphates.

According to this invention, it has been found that excellent yields of O,O-dimethyl O-phenyl thiophosphates are surprisingly and effectively obtained when substantially equimolar quantities of a phenol and anhydrous O,O-dimethyl chlorothiophosphate in the presence of a suitable diluent or slurrying agent such as an aromatic hydrocarbon are reacted in the presence of cuprous chloride as a catalyst and an anhydrous acid binding agent, such as sodium carbonate, potassium carbonate or calcium carbonate and their equivalents. Yields in the order of 96–99.5%, hitherto unobtainable, are unexpectedly realized when the instant reaction is carried out at reflux with azeotropic water removal under reduced pressure.

While toluene is preferred as a diluent or slurrying agent, benzene, xylene or methyl naphthalene and their equivalents may also be used as a diluent. A particular advantage of the present invention is in the permissible use of toluene as a diluent or slurrying agent. Toluene is ordinarily used in the preparation of one of the reactants herein employed, namely, O,O-dimethyl chlorothiophosphate. Accordingly, the toluene need not be removed prior to reaction, as it is an important component of the instant reaction.

Any substituted or unsubstituted phenol may be used provided the substituents do not interfere with the reaction. Such substituents are chloro, bromo, fluoro, nitro, amido, cyano, carboxy, etc. are within the purview of this invention.

According to this invention it has been further found that the amount of cuprous chloride is surprisingly critical and the range of 0.002–0.005 mole of catalyst per mole of O,O-dimethyl chlorothiophosphate reactant is important in recovering quantitative yields of O,O-dimethyl O-phenyl thiophosphates. If noticeably higher or lower mole quantities are used, the yields are radically reduced.

It has been also found that cupric salts or cuprous salts of other halides are not satisfactory. For example, where cupric chloride or cuprous bromide were employed as the catalyst, quantitative yields could not be obtained. It was observed that substantially no conversion to O,O-dimethyl O-p-nitrophenyl thiophosphate occurred where cuprous chloride and monochlorobenzene were employed in the reaction of p-nitrophenol and O,O-dimethyl chlorothiophosphate. Hence, it was indeed surprising to obtain quantitative yields when utilizing a particular range of cuprous chloride catalyst in an aromatic hydrocarbon diluent.

The invention is further illustrated by the following examples but these are not to be construed as being limited thereto.

Example 1

In 280 cc. toluene are slurried 1.1 moles (154 gms.) of p-nitrophenol, 1 mole (160.5 gms.) of O,O-dimethyl-chlorothiophosphate (predried), 0.75 mole (79.5 gms.) of sodium carbonate (predried) and 0.003 mole (0.5 gm.) of cuprous chloride. The mixture is then refluxed at 80° C. under 220–226 mm. Hg pressure with azeotropic water removal for six hours. The reaction mass is then filtered. The solids are washed with toluene which extract is added to the filtrate. Toluene is then stripped from the filtrate to 65° C. under 25 mm. and held at 65° C. for one half an hour. The product, O,O-dimethyl O-p-nitrophenyl thiophosphate is recovered in 97% yields of excellent purity.

Where 0.001 mole of cuprous chloride is employed in this example, the yield of the product drops to 56.5%. Similarly, when 0.01 mole of cuprous chloride is used, the yield of the product again dropped from 97% to 67%.

While reflux is illustrated in this example at 80° C., temperatures within the range of 50°–100° C. and a pressure below atmospheric may be used.

The removal of water during the course of the reaction is of paramount importance. Any means known to the art may be used. A preferred method is refluxing the reaction mass with azeotropic water removal as described in the above example.

Example 2

Example 1 is repeated except 1.1 mole of o-chloro-p-nitrophenol replaces the p-nitrophenol reactant. A 97.5% yield of O,O-dimethyl O-(2-chloro-4-nitrophenyl)thiophosphate is obtained.

Example 3

29.9 grams of sodium carbonate containing 7% moisture is slurried in 63.3 cc. of toluene. The slurried mass is then refluxed at 110° C. for fifteen minutes with azeotropic water removal. To the predried sodium carbonate is added under agitation 53.5 grams (0.39 mole) p-nitrophenol, 0.21 gram (0.001 mole) of cuprous chloride and a solution of 56.2 gms. (0.35 mole) of O,O-dimethyl chlorothiophosphate in 34.6 cc. toluene. The reaction mass is heated to 80° C. at 225±5 mm. Hg pressure for five and one half hours. The slurry is washed with water for thirty minutes at 55° C. and is settled for thirty minutes. Two layers are formed, a water layer and an organic layer. The water layer is discarded and the organic layer is again washed with 4% aqueous sodium carbonate. After settling, a second water layer that is formed is discarded and the formed organic layer is stripped to 65° C. at 25 mm. Hg and held for one half hour to expel substantially all the toluene. A yield of 98% of O,O-dimethyl O-p-nitrophenyl thiophosphate is obtained of extremely high quality.

The order of introducing the reactants is not of critical import. Any order of reactant addition may be followed as illustrated by the examples above. It is, however, of paramount importance to maintain a substantially anhydrous system during reaction for otherwise the desirable yields of product cannot be readily obtained, since water adversely affects the yield.

While the invention has been defined as utilizing cuprous chloride solely as the catalyst, a mixture of cuprous chloride and cupric chloride may also be used. However, the amount of cuprous chloride which is in the mixture must be present within the mole limits specified supra, namely from 0.002 to 0.005 mole per mole of O,O-dimethyl chlorothiophosphate reactant.

We claim:

1. In an improved process for preparing an O,O-dimethyl O-phenyl thiophosphate product of high yield and purity by reacting substantially equimolar quantities of a phenol and anhydrous O,O-dimethyl chlorothiophosphate in an aromatic hydrocarbon diluent and in the presence of an anhydrous acid binding agent, the improvement which consists in the steps of: reacting said components in the presence of from 0.002 to 0.005 mole of cuprous chloride catalyst per mole of O,O-dimethyl chlorothiophosphate under reflux with azeotropic water removal at subatmospheric pressure.

2. In the process according to claim 1 wherein 0.003 mole of cuprous chloride catalyst is added per mole of O,O-dimethyl chlorothiophosphate.

3. A process according to claim 1 wherein the anhydrous acid binding agent is sodium carbonate.

4. A process according to claim 1 wherein the subatmospheric pressure is 220–226 mm. Hg.

5. A process according to claim 1 wherein 1.1 moles of p-nitrophenol per mole of O,O-dimethyl chlorothiophosphate are reacted.

6. A process according to claim 1 wherein the phenol is 2-chloro-4-nitrophenol.

7. An improved process for preparing O,O-dimethyl O-p-nitrophenyl thiophosphate of high purity and yield which consists in the steps of reacting in the presence of an anhydrous acid binding agent substantially equimolar quantities of p-nitrophenol and anhydrous O,O-dimethyl chlorothiophosphate in toluene and in the presence of a cuprous chloride catalyst, azeotropically removing water under reduced pressure, filtering the reaction mass and recovering said O,O-dimethyl O-p-nitrophenyl thiophosphate from the filtrate, said catalyst being present within the range of from 0.002 to 0.005 mole per mole of O,O-dimethyl chlorothiophosphate.

8. In the process according to claim 7 wherein the catalyst added is 0.003 mole of cuprous chloride per mole of O,O-dimethyl chlorothiophosphate.

References Cited in the file of this patent

UNITED STATES PATENTS

| | | |
|---|---|---|
| 2,624,745 | Schrader | Jan. 6, 1953 |
| 2,657,229 | Orochena | Oct. 27, 1953 |
| 2,664,437 | Fletcher | Dec. 29, 1953 |